United States Patent Office 3,143,432
Patented Aug. 4, 1964

---

3,143,432
OPTICAL GLASS
Heinz Brömer, Germannstein, and Norbert L. Meinert, Wetzlar (Lahn), Germany, assignors to Ernst Leitz, G.m.b.H., Wetzlar (Lahn), Germany, a corporation of Germany
No Drawing. Filed Jan. 6, 1960, Ser. No. 705
Claims priority, application Germany Jan. 9, 1959
2 Claims. (Cl. 106—54)

Our invention relates to optical glasses of high index of refraction and small dispersion which are especially stable against chemicals and the atmosphere.

In co-pending application Serial No. 786,726, filed January 14, 1959, optical glasses are described which consist of a glass base of silicon dioxide, boron trioxide and lanthanum trioxide together with aluminum trioxide and further with oxides used in the preparation of glass, in which the lanthanum oxide totals at least 20% by weight and the boron trioxide at least 32% by weight of the total glass mix. Further in this co-pending application there are described glasses of the above mentioned glass base and additional oxides in which the amount of lanthanum oxide shall amount to at least 40% by weight.

Furthermore, boro-silicate glasses are known in the literature which contain greater amounts of lanthanum oxide as well as barium oxide. These last mentioned glasses are, however, very sensitive to spotting or staining so that their preparation and their use, particularly in tropical districts, present serious difficulties.

Our present invention relates to glasses which are extraordinarily stable without the use of aluminum oxide and which possess optical values desired in glasses to be used in modern precision objectives. The glasses may be very easily melted, are colorless, and present no difficulties in their application and use. They are characterized in that they contain between 20% and 46% by weight of silica and boron trioxide, of which the silica alone is between 14% and 35% by weight, between 30% and 40% by weight of lanthanum oxide as well as between 7.5% and 20% by weight of alkaline earth oxides, of which the amount of barium oxide is not to exceed 5% by weight. To these glasses up to 10% by weight of zirconium oxide as well as up to 10% by weight of zinc oxide and/or cadmium oxide can be added. To adjust the optical values, up to 10% by weight of the oxides of tantalum, niobium, lead, tungsten, and titanium may be used additionally.

The amount of added barium oxide is to remain as low as possible since the barium oxide makes the glass soft and sensitive. Of the alkaline earth oxides, calcium is preferably to be used.

In the following table are shown some examples of the above glasses.

Table

| Melt No. | Si 2 | Si 5 | Si 8 | Si 3 | Si 7 | Si 10 | Si 21 |
|---|---|---|---|---|---|---|---|
| $SiO_2$ | 16.0 | 18.5 | 21.0 | 25.0 | 25.0 | 33.5 | 22.0 |
| $B_2O_3$ | 30.0 | 21.8 | 21.0 | 20.0 | 15.0 | 5.5 | 20.0 |
| $La_2O_3$ | 32.0 | 39.1 | 34.8 | 33.0 | 36.0 | 36.7 | 37.0 |
| $CaO$ | 17.0 | 15.2 | 17.9 | 17.0 | 19.0 | 18.9 | 11.0 |
| $ZrO_2$ | 5.0 | 5.4 | 5.3 | 5.0 | 5.0 | 5.0 | 5.0 |
| $BaO$ | | | | | | | 5.0 |
| $n_d$ | 1.688 | 1.699 | 1.692 | 1.685 | 1.688 | 1.697 | 1.690 |
| $v_e$ | 54.6 | 52.9 | 53.5 | 53.5 | 53.4 | 51.6 | 53.4 |

| Melt No. | Si 12 | Si 13 | Si 33 | Si 32 | Si 35 |
|---|---|---|---|---|---|
| $SiO_2$ | 23.5 | 21.0 | 21.0 | 33.4 | 21.0 |
| $B_2O_3$ | 20.1 | 10.5 | 10.5 | 5.5 | 10.5 |
| $La_2O_3$ | 32.8 | 39.5 | 32.0 | 30.0 | 32.0 |
| $CaO$ | 14.4 | 15.0 | 15.0 | 18.9 | 15.0 |
| $ZrO_2$ | 6.2 | 5.0 | 5.0 | 5.5 | 7.5 |
| $BaO$ | | | | | |
| $ZnO$ | 3.0 | 9.0 | 9.0 | | 9.0 |
| $WO_3$ | | | 7.5 | | |
| $Ta_2O_5$ | | | | 6.7 | |
| $TiO_2$ | | | | | 5.0 |
| $n_d$ | 1.696 | 1.735 | 1.737 | 1.701 | 1.760 |
| $v_e$ | 52.3 | 49.0 | 46.4 | 49.8 | 42.1 |

The glasses are melted down in platinum vessels at temperatures between 1350° C. and 1500° C. They may be stirred to about 1100° C. and cast in the usual manner.

Decolorizing substances, arsenic oxide, or stabilizing substances, as aluminum oxide may be added to the mixture in small amounts.

Having described our invention, we claim:
1. Optical glass with high index of refraction and small dispersion consisting essentially of

|   | Percent by weight |
|---|---|
| Silica and boron trioxide | 20–46 |
| of which silica is | 14–35 |
| and the boron trioxide is not less than | 5.5 |
| Lanthanum oxide | 30–40 |
| Alkaline earth oxide | 7.5–20 |
| of which barium oxide is less than | .5 |
| Zirconium oxide | 0–10 |
| at least one oxide of the group consisting of the oxides of zinc and cadmium | 0–10 |

2. The optical glass of claim 1 containing additionally up to 10% by weight of at least one oxide of the group consisting of tantalum, niobium, tungsten, lead, and titanium.

References Cited in the file of this patent

UNITED STATES PATENTS

| 2,745,757 | Geffcken | May 15, 1956 |
| 2,805,166 | Loffler | Sept. 3, 1957 |
| 2,899,322 | Bromer et al. | Aug. 11, 1959 |
| 3,006,776 | Geffcken | Oct. 31, 1961 |

OTHER REFERENCES

The Manufacture of Optical Glass and of Optical Systems, 1921, pages 100 and 132.

UNITED STATES PATENT OFFICE

CERTIFICATE OF CORRECTION

Patent No. 3,143,432                      August 4, 1964

Heinz Brömer et al.

It is hereby certified that error appears in the above numbered patent requiring correction and that the said Letters Patent should read as corrected below.

In the grant, lines 1 and 2, and in the heading to the printed specification, line 3, name of second inventor, for "Norbert L. Meinert", each occurrence, read -- Norbert Meinert Signed and sealed this 24th day of November 1964.

(SEAL)
Attest:

ERNEST W. SWIDER
Attesting Officer

EDWARD J. BRENNER
Commissioner of Patents